Jan. 10, 1939.  F. G. SALERNO  2,143,525
BAKING OVEN
Filed April 30, 1936   4 Sheets-Sheet 1
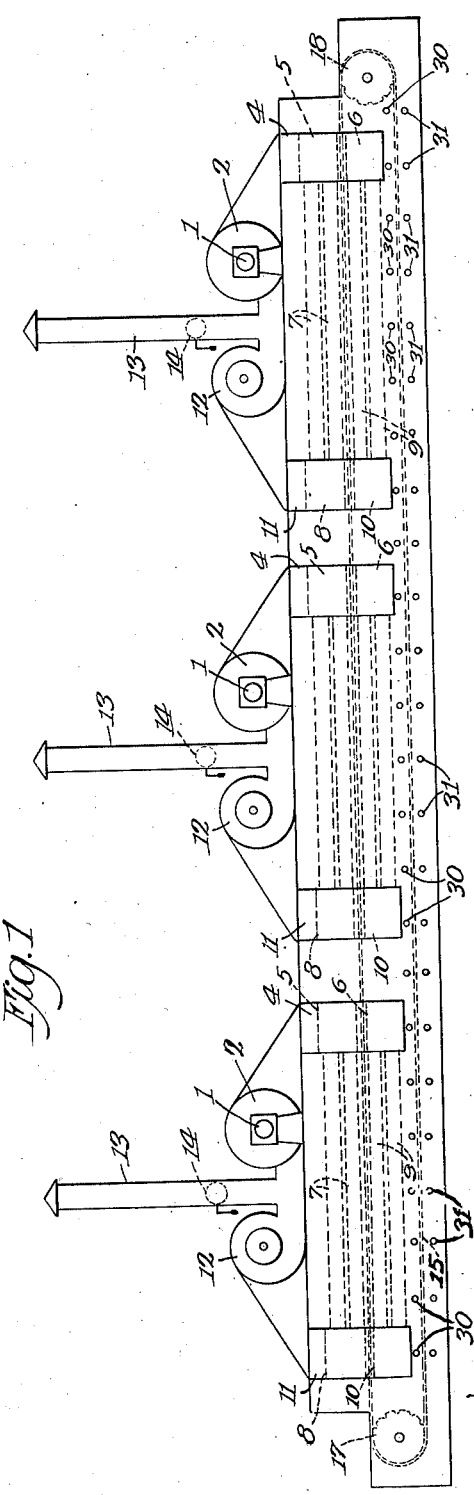
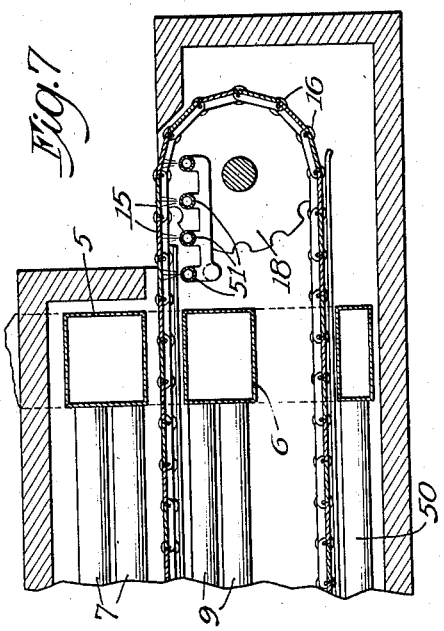
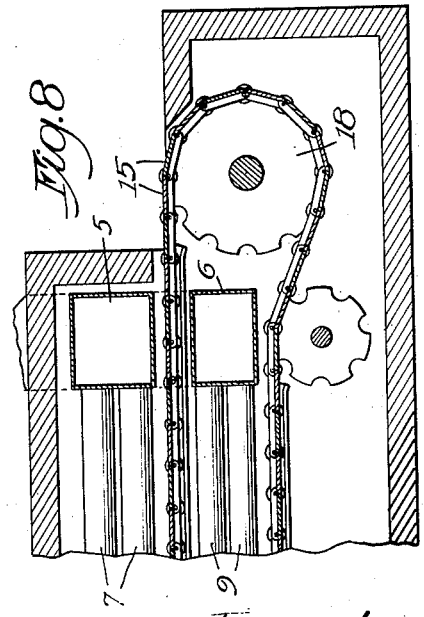

Jan. 10, 1939.    F. G. SALERNO    2,143,525
BAKING OVEN
Filed April 30, 1936    4 Sheets-Sheet 2
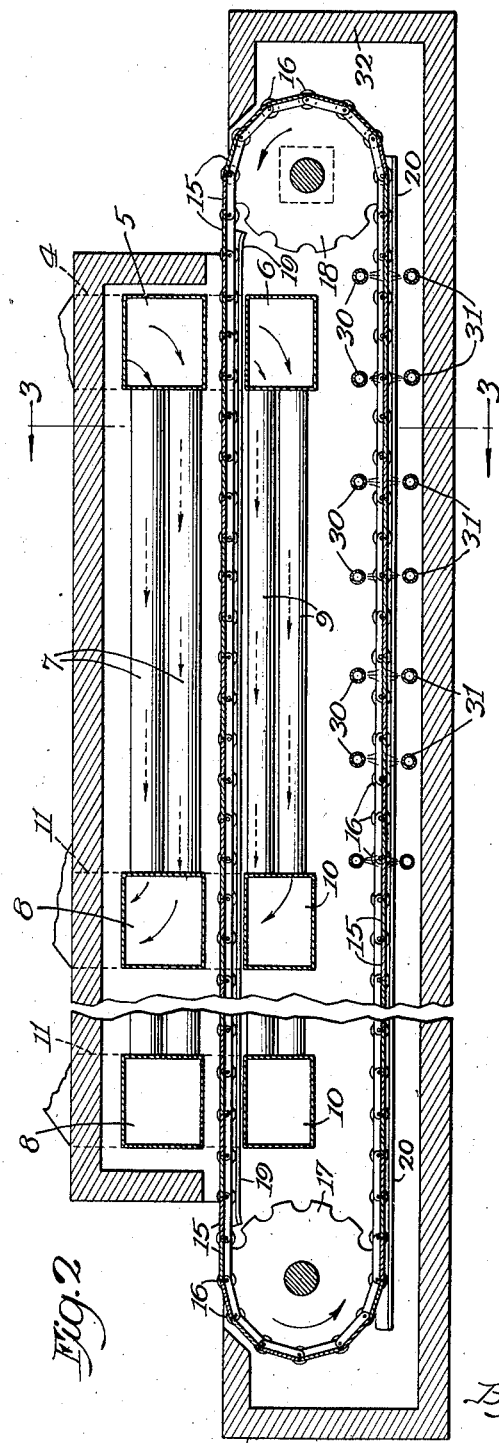
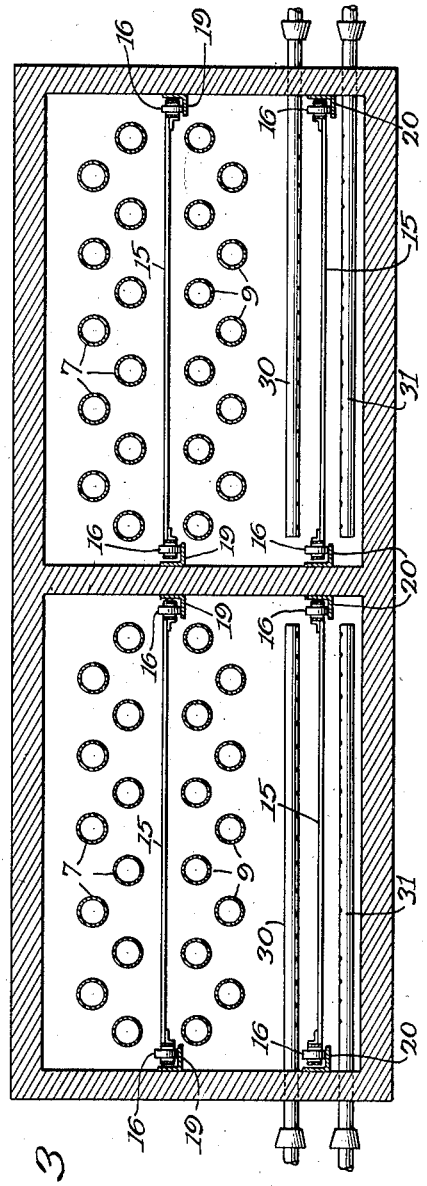
Inventor:
Fred G. Salerno,
By Lewis, Lindsey, Smith & Shorts
His Attys.

Jan. 10, 1939.  F. G. SALERNO  2,143,525
BAKING OVEN
Filed April 30, 1936   4 Sheets-Sheet 3
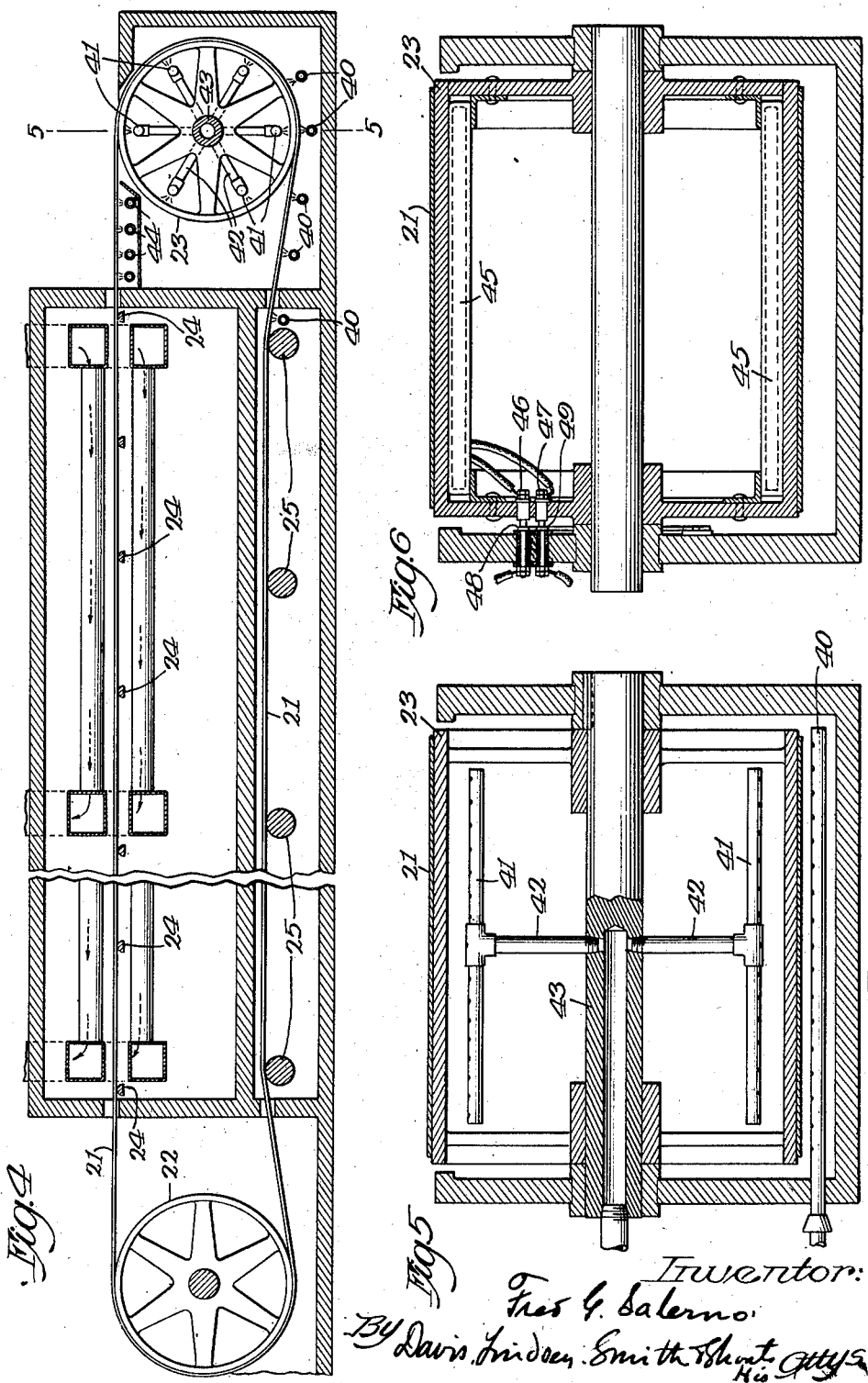
Inventor:
Fred G. Salerno
By Davis, Lindsey, Smith & Shonts
His Attys Jan. 10, 1939.   F. G. SALERNO   2,143,525
BAKING OVEN
Filed April 30, 1936   4 Sheets-Sheet 4
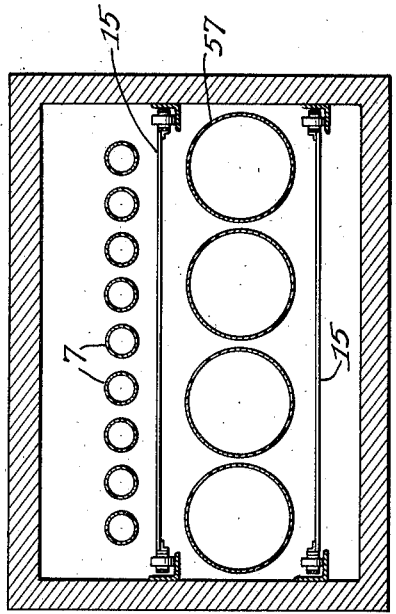
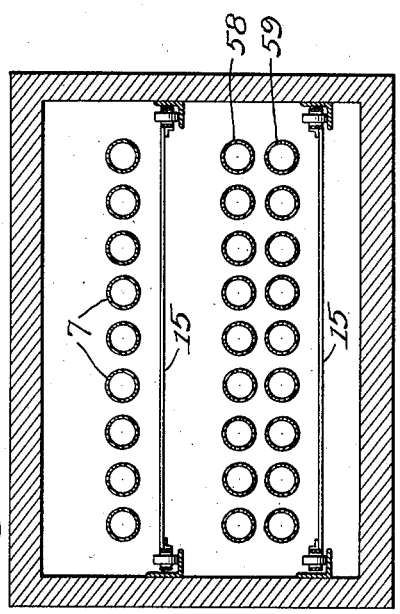
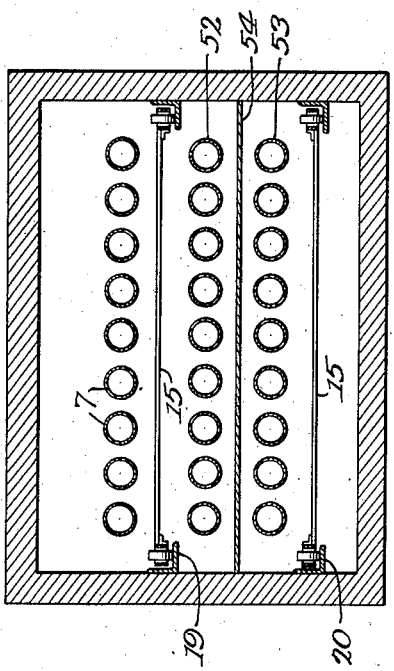
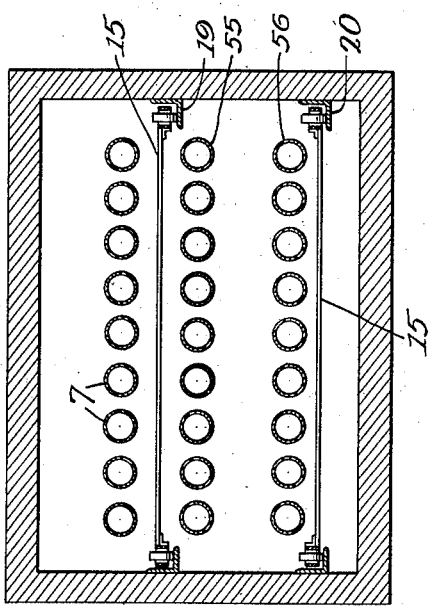

Patented Jan. 10, 1939

2,143,525

UNITED STATES PATENT OFFICE

2,143,525

BAKING OVEN

Fred G. Salerno, Chicago, Ill.

Application April 30, 1936, Serial No. 77,177

3 Claims. (Cl. 107—57)

The present invention relates to baking ovens of the traveling conveyor type, commonly termed in the trade "traveling" ovens, and used in commercial bakeries for the production on a large scale of different kinds of bakery products which are known variously as crackers, biscuits, wafers, cookies, different sorts of snaps, etc.

Previous to giving a description of the improvements to which my invention relates, it may be explained that different products require different modes of application of the baking heat to the oven and the goods, and that to the most perfect baking of certain types of biscuits, such as the thin, flaky, unsweetened crackers of the white soda cracker type of biscuits or wafers commercially known as Uneeda Biscuits and Saltine Crackers, it is essential to perfect baking and the production of such biscuits or crackers of the highest quality that from the instant of their introduction into the oven they shall be supported upon heated carrier surfaces and at once subjected to the highest degree of heat which is applied to them at any time during the baking process.

In large commercial bakeries producing different kinds of bakery products, including those above mentioned, it has heretofore been the practice to bake the best qualities of unsweetened soda crackers or biscuits above referred to in ovens of the type known as "reel" ovens (with which the present invention is not concerned), in which the uncooked dough crackers are introduced at the hottest point upon plates which are thoroughly heated, but it has been found that ovens of the traveling conveyor type, though quite satisfactory for the production of many kinds of cookies or cakes baked from a sweetened dough, do not bake crackers of unsweetened soda cracker dough, or doughs to some extent of the same character, perfectly and produce goods of the highest quality. It is the object of my invention to improve the baking qualities of ovens of the traveling conveyor type so that they will bake all kinds of crackers, wafers and cookies to the highest degree of perfection, and equal the performance of "reel" ovens in baking unsweetened crackers and biscuits of the kind before mentioned, by the provision of means for pre-heating the traveling conveyor table on its return travel from the delivery end of the oven to the loading or receiving field where the formed dough wafers are deposited upon it, the essential elements of my invention being more particularly pointed out in the appended claims.

In the accompanying drawings I have illustrated, for purposes of exposition, a well-known form of traveling oven heated by oil burners to which my invention is applied, though it will be understood that in its broader aspects my invention may be applied to ovens which are otherwise heated, as by electric heating devices, superheated steam coils, or coal-burning heaters. In said drawings:

Figure 1 is a side elevation, on a small scale and in part diagrammatic of a typical traveling oven heated by oil burners;

Fig. 2 is a vertical longitudinal section, on a larger scale, of the receiving and delivery end of the oven shown in Fig. 1, broken away between the ends, the conveyor table in this instance being of the linked traveling plate type, and illustrates one form of my invention applied thereto;

Fig. 3 is a transverse vertical section of the same on the line 3—3 of Fig. 2;

Fig. 4 is a vertical section, corresponding to Fig. 2, showing my invention applied to a traveling oven of the steel band type;

Fig. 5 is a vertical axial section of the form of oven shown in Fig. 4 in a plane taken through the conveyor drum adjacent the receiving end of the conveyor belt by which the wafers are carried through the oven, illustrating a different form of pre-heating mechanism associated with said drum;

Fig. 6 is a similar section illustrating a pre-heating device in which the heating is accomplished by means of electrical heating elements;

Fig. 7 is a fragmentary vertical section of the receiving end of an oven of the traveling plate conveyor type, illustrating pre-heating means in which the heating is accomplished by heater pipes arranged to circulate heated gas from an oil burner;

Fig. 8 is a similar fragmentary vertical section illustrating another form of my invention; and Figs. 9, 10, 11 and 12 are transverse vertical sections in planes corresponding to that of Fig. 3, but showing single ovens in which the pre-heating of the return reach of the conveyor table is effected through different arrangements of heater pipes.

Like reference characters indicate like parts in all the figures of the drawings.

First describing briefly the general construction of the oil-burner-heated traveling plate oven illustrated in Figs. 1, 2 and 3, the principal parts of which are old in the art, it will be understood that such ovens are frequently of double construction, with twin oven sections extending side by side, as indicated by the cross section shown in Fig. 3. The ovens in such a case are duplicates of each other, and a single description will suffice for both.

The oven is commonly constructed in sections arranged longitudinally of the traveling conveyor table, each section or division being heated by independently controlled heating means. In the present instance three sections are shown (see Fig. 1) although it will be understood that a greater or less number may be employed. As illustrated, each section is heated by an oil burner 1 arranged to discharge the products of combustion into a distributing box 2 from which they pass through a vertical inlet duct 4 at the side of the section into an upper header 5 above the plane of the conveyor table, and a lower header 6 below said plane. Communicating with the upper header 5 are a set of upper heating pipes 7 which also communicate with an upper discharge header 8, and communicating with the lower header 6 are a set of lower heating pipes 9 which similarly also communicate with a lower discharge header 10; the headers 8 and 10 both communicating with a vertical exit duct 11. This exit duct communicates with the intake passage of a motor-driven blower 12 arranged to force the air into the distributing box 2 before mentioned, where it receives an increment of fresh highly heated gases from the oil burner and is again circulated through the heating passages before described,—the excess gases being vented through a vent pipe 13 controlled by a weighted damper 14,—all according to well-known practice in the art.

The flexible traveling conveyor table upon which the articles to be baked are carried through the oven, as shown in Figs. 2 and 3, is made up of a series of narrow rectangular plates 15 each secured to the inner members of pairs of twin links which are pivoted to links similarly secured to the adjacent plates. Rotatably mounted on the pivots by which the links are connected are rollers 16 arranged to run over a pair of driving sprocket wheels 17 at the delivery end of the belt and a pair of supporting sprocket wheels 18 at the receiving end of the same, the rollers running intermediate the wheels upon a pair of upper tracks 19, and a pair of lower tracks 20. The plates are closely jointed together so that the upper surface of the conveyor is a smooth, continuous, traveling metal table. The upper reach of the belt travels through the oven sections between the upper heating pipes 7 and the lower heating pipes 9, by means of which the baking is accomplished.

It will be understood that the oven and associated operating means are provided with the necessary and usual pyrometer controls for independently regulating the heat of the oven sections; means for regulating the speed of the belt, and inspection doors and windows for observing the progress of the baking.

The steel band type of traveling oven illustrated in Figs. 4, 5 and 6 differs from that above described in that the conveyor table consists of a continuous, thin, flexible metal belt 21 traveling over a driving drum 22 at the discharge end of the conveyor and an idler drum 23 at the receiving end of the same, the lower reach of the belt being supported by rollers 24 and the upper reach being supported by brackets 25 having rounded supporting faces,—see Fig. 4. The lower reach of the traveling conveyor in all traveling ovens of the steel band type known to me returns from the delivery end drum to the receiving end drum below a horizontal insulated partition which forms the bottom of the baking sections of the oven, and hence runs entirely outside the cooking chamber.

In the production of most kinds of bakery goods the uncooked dough, formed into wafers by means with which the present invention has nothing to do, is deposited on the receiving field of the conveyor table (whether in the plate type or steel band type of traveling oven) between the point at which the conveyor rounds the top of the driving drum and the point at which it enters the oven chamber of the first section. This may be done automatically by delivery mechanism associated with the wafer-dough forming mechanism, or manually by skilled operators, who deliver large trays full of formed dough wafers by sliding them quickly at once onto the top of the conveyor, at proper intervals.

In the practical operation of both varieties of traveling ovens, the temperature of the oven and its different sections are varied according to the kind of goods being baked. In the case of sweet cookies and cakes the temperature is comparatively low,—from 300 degrees to 400 degrees F., and in some cases the temperature may be the same in all sections, while in others they may even be higher at the later stages. Other varieties of goods may require different treatment and quicker baking, dependent upon their nature. In the case of unsweetened crackers, of the soda cracker type before referred to, it is necessary that the first section be highly heated,—say to between 700 degrees and 800 degrees F.,—and preferably the succeeding sections are heated each to a lower temperature, for instance 50 degrees lower at each step, than the preceding one.

As before stated, it has not heretofore been possible to bake certain types of wafers or crackers to the highest degree of perfection in traveling ovens, and I believe that this is due to the fact that the metal table elements of the conveyor become cooled on their return travel from the delivery end to the receiving end of the conveyor. Both the upper heating pipes 7 and lower heating pipes 9 are above the center of the oven, and the tendency of the heat is to rise, with the result that the oven temperature adjacent the upper reach of the belt is much above that adjacent the lower reach, which latter is not directly heated by such pipes at all. Furthermore, the table elements pass downwardly from the most highly heated upper section of the oven to the least heated lower zone at the delivery end of the least heated section of the oven, and the table elements then return in a plane near the bottom of the oven chamber. In their long, slow return travel, a distance of perhaps eighty or a hundred feet, the plates of the table inevitably lose a large part of their heat. The lower heating pipes 9 of the oven, arranged immediately below the upper reach of the conveyor table with a view to heating it only are above and too far away from the lower return reach to restore any appreciable part of this lost heat, and the result is that when the cool dough crackers are deposited upon them at the time they reach the receiving field, the dough absorbs a large proportion of such heat as they yet contain, and the rising or "springing" of the dough and subsequent cooking cannot take place at all until the plates and dough are heated together after they have traveled some distance in the first section of the oven. In this interval of time some of the moisture has evaporated, and the wafer-dough rises slowly and heavily instead of "springing" or puffing quickly as it should do, and the result is a tough, hard, inferior product.

To overcome these defects I have provided pre-heating means for reheating the conveyor table elements, before they reach the receiving field and immediately thereafter enter the oven chamber of the first section, to such a degree that when the formed dough wafers are imposed upon them they will be immediately acted upon by the combined heat of the conveyor plates and the heating elements of the oven section and spring or puff properly and immediately begin cooking. This action results in a light and tender product of superior quality.

In Figs. 2 and 3 I have shown pre-heating means consisting of a set of upper transversely arranged gas burner tubes 30 arranged above the path of the plate 15 of the linked-plate conveyor table adjacent the return loop of the conveyor, and a set of similar lower tubes 31 opposite the tubes 30; the burner jets all being arranged to impinge upon such plates to effectively heat them to a sufficient temperature. One or the other of these sets of burner tubes (preferably the upper) may be omitted, however, the remaining tubes in such case being of course made of such heating capacity as to sufficiently heat the plates.

Furthermore, as shown in Fig. 1, the pre-heating burners (or equivalent pre-heating heating elements later referred to) may extend the entire length of the return portion of the conveyor or table, or, as shown in Fig. 2, heat may be applied only to the leading portion, adjacent the receiving end of the oven, or it may be applied at any other portion in the return portion of the table which will effectively bring about the desired temperature at the loading or receiving field.

To guard against undue dissipation of heat from the pre-heated plates, and to protect attendants of the machine, a protecting wall 32 is preferably provided enclosing the loop of the conveyor table at the receiving end of the oven.

In Figs. 4 and 5 I have illustrated a form of my invention in which the pre-heating means comprises a series of transverse burner tubes 40 formed with jet orifices arranged to direct the flames against the under face of the steel band 21 of the conveyor; and also a series of orificed burner tubes 41 carried by radial tubes 42 secured to a stationary hollow shaft 43 upon which the supporting drum 23 is mounted and the bore of which provides communication for the heating gas through the tubes 42 and 41; and an upper set of transverse burner tubes 44 immediately under the receiving field of the conveyor table. The jets of flame from the burner orifices impinge upon the inner face of the drum 23 and heat it, and through it heat the steel band conveyor.

It is manifest that the series of gas burner tubes 30 and 31 (or either series alone) used as heretofore described in connection with the traveling plate conveyor illustrated in Figs. 2 and 3, may be supplemented by a cylindrical series of gas burner tubes inside the loop of the conveyor and corresponding in arrangement with the tubes 41 just described; and also that burner tubes such as the tubes 44 may also be employed with the plate conveyor form of traveling oven, if desired.

In Fig. 6 I have shown an electric pre-heating device which is also shown applied to the steel band type of traveling oven. In this device the electric heating elements 45 are secured to the inner face of the drum 23 in a circular series, the terminals 46—47 of each heater element being arranged to make constant electrical contact with a pair of stationary slip rings, marked 48 and 49, in electrical connection with the terminals of a source of electric energy, not shown. In connection with this electrical heating device, gas burner tubes, such as the tubes 41 and 44 hereinbefore described, may be employed, if necessary, or additional electric heating elements, similarly arranged, may be used.

In Fig. 7 I have illustrated pre-heating means consisting of heating pipes 50 which may be heated by the heated products of combustion of an oil-burner, either the burner by means of which the first section of the furnace is heated, as illustrated, or an independent burner, if desired, and the heat of such pipes may be supplemented, if necessary, by gas burner tubes, or electric heater elements, or by additional heating pipes at the points hereinbefore described, a set of gas burner tubes 51 immediately below the loading field being illustrated in said Figure 7. The pre-heating pipes 50 or supplemental heating pipes arranged in the loop of the conveyor table or below the loading field may also be heated by super-heated steam or other highly heated gas from a suitable apparatus for supplying such gas.

In all the different forms of pre-heating means hereinbefore described or mentioned, it will, of course, be understood that ordinary or suitable means of control and adjustment are employed for regulating the amount of heat supplied.

It will be understood that broadly considered the different specific heating means hereinbefore described are equivalent, and that in its broadest aspect it is essential to my invention only that at some point in the path of the return movement of the metal table elements of the conveyor to the loading or receiving field, such elements shall be reheated or pre-heated before reaching such field, or before entrance into the first section of the oven,—i. e., shall be preheated to the rear of such field or oven section, considered with reference to the onward or forward travel of the conveyor,—to such a degree that the pre-heated portion will, upon arrival at the receiving field and entrance into the oven, produce the effects described and attain the advantages and results hereinbefore explained.

While the most convenient and effective point to pre-heat the conveyor table in its return movement is somewhere in its leading portion adjacent the loop at the receiving or loading end of the oven, yet the conveyor may be heated at any point in its return path, provided it be heated to such a degree, and loss of heat prevented by suitable construction and insulation, that it will reach the loading field sufficiently heated.

Pre-heating of the return reach of the conveyor table may also be effected by lifting the middle portion of the return flight of the table to a level immediately below the heating pipes 9 of the oven sections (or of the first oven section) as illustrated in Fig. 8, so that the plates 15 will be effectively heated; or by positioning and rearranging heating pipes corresponding in some measure to those previously employed in the art below the upper reach of the belt, so that they will reheat, or pre-heat, the return portion of the belt to such a degree as to have the effect and produce the results hereinbefore described.

In Fig. 9 I have shown in cross-section one such arrangement in which the heating pipes 52 below the upper reach of the conveyor table and a set of pipes 53 therebelow (corresponding generally to the heating pipes 9 hereinbefore mentioned) are separated by a baffle plate 54 so as to produce effective heating of the plates of the lower reach of the table, as well as those of the upper reach.

In Fig. 10 the pipes 55 are arranged immediately below the upper reach, while the lowermost pipes 56 are arranged in close proximity to the top of the lower reach of the conveyor.

In Fig. 11 I have shown a single series of heating pipes 57 of large size and heating capacity arranged at an intermediate position between the upper and lower reaches of the conveyor table, so as to both provide baking heat for baking the crackers on the upper reach of the conveyor, and also afford adequate additional heat to effectively reheat the return portion of the table.

The arrangement of the heating pipes in Fig. 12 is similar to that shown in Fig. 11, except that two banks of heating pipes, the upper one marked 58 and the lower ones 59, are employed.

In the different arrangements shown in Figs. 8, 9, 10, 11 and 12, it will be understood that the heating gas may be provided by the oil-burner by which the crackers in the first section of the oven are baked; or heating pipes arranged as shown may be employed in two or more sections; and also that if desired an independent, additional burner may be provided for heating those pipes concerned with heating the return portion of the conveyor table. Furthermore, supplementary heating means for additionally heating the return reach of the conveyor may be employed as hereinbefore explained, if found necessary or advantageous.

The steel belt type of conveyor may also be pre-heated on its return reach by heating pipes arranged in a similar manner to the arrangements shown in the figures of the drawing last referred to.

I claim:

1. In combination with the endless steel band conveyor table of a traveling oven, said conveyor table engaging drums at loops at the receiving and delivery ends of said oven and said oven being provided with means for heating the upper reach of said table, preheating means inside of and arranged to heat the drum at the receiving end loop of said table.

2. In combination with the endless steel band conveyor table of a traveling oven, said conveyor table engaging drums at loops at the receiving and delivery ends of said oven and said oven being provided with means for heating the upper reach of said table, preheating means comprising electrical heating elements secured to the peripheral wall of the drum at the receiving end loop of said table.

3. In combination with the endless steel band conveyor table of a traveling oven, said conveyor table engaging drums at loops at the receiving and delivery ends of said oven and said oven being provided with means for heating the upper reach of said table, preheating means comprising a stationary gas burner frame inside the drum at the receiving end loop of said table equipped with orificed burner tubes arranged to direct jets of flame against the inner face of said drum.

FRED G. SALERNO.